(12) United States Patent
Liebel et al.

(10) Patent No.: US 8,517,873 B2
(45) Date of Patent: Aug. 27, 2013

(54) TENSIONING AND DAMPING DEVICE FOR TRACTION-MECHANISM DRIVES

(75) Inventors: Thorsten Liebel, Furth (DE); Fred G. Seebeck, Royal Oak, MI (US); Scott Thompson, Warren, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 979 days.

(21) Appl. No.: 12/571,635

(22) Filed: Oct. 1, 2009

(65) Prior Publication Data

US 2010/0081529 A1    Apr. 1, 2010

Related U.S. Application Data

(60) Provisional application No. 61/101,830, filed on Oct. 1, 2008.

(30) Foreign Application Priority Data

Oct. 2, 2008   (DE) .......................... 10 2008 050 384

(51) Int. Cl.
*F16H 7/10*    (2006.01)
(52) U.S. Cl.
USPC ....................................................... 474/133
(58) Field of Classification Search
USPC .................................................. 474/133, 135
See application file for complete search history.

(56) References Cited

U.S. PATENT DOCUMENTS

| | | | | |
|---|---|---|---|---|
| 6,497,632 | B2 * | 12/2002 | Ayukawa et al. | 474/135 |
| 6,582,332 | B2 * | 6/2003 | Serkh | 474/135 |
| 7,004,863 | B2 * | 2/2006 | Serkh et al. | 474/109 |
| 7,104,909 | B2 * | 9/2006 | Asbeck et al. | 474/135 |

(Continued)

FOREIGN PATENT DOCUMENTS

| | | |
|---|---|---|
| DE | 10063638 | 1/2002 |
| DE | 10131916 | 1/2003 |

(Continued)

*Primary Examiner* — William E Dondero
*Assistant Examiner* — Robert T Reese
(74) *Attorney, Agent, or Firm* — Volpe and Koenig, P.C.

(57) ABSTRACT

A tensioning device for a traction mechanism drive for a belt drive that is incorporated in an internal combustion engine, in order to drive components of the engine or installed accessories. The tensioning device has a construction that is advantageous under production and construction viewpoints, by a high degree of robustness, and also by an advantageous mechanical operating behavior. The tensioning device includes a base part, a swivel arm, a torsion spring with a first winding end section that is allocated to the swivel arm and a second winding section that is allocated to the base part for applying a pivoting moment acting between the base part and the swivel arm and forcing the swivel arm in a tensioning direction, and a damping device for generating a damping force that counteracts a pivoting of the swivel arm directed against the tensioning direction. This damping device includes a first friction surface element that is arranged in a region of the winding end section of the torsion spring allocated to the swivel arm, and forms a friction surface that is used for applying friction force and that sits on a counter friction surface. In the region of the second winding end of the torsion spring for the base part, there is a second friction surface element that forms a friction surface that sits on a counter friction surface, and the counter friction surface is formed by a friction surface structure that can pivot together with the swivel arm.

22 Claims, 9 Drawing Sheets

(56) References Cited

U.S. PATENT DOCUMENTS

| | | | | |
|---|---|---|---|---|
| 7,678,002 B2 * | 3/2010 | Joslyn | | 474/135 |
| 7,803,078 B2 * | 9/2010 | D'Silva et al. | | 474/117 |
| 8,118,698 B2 * | 2/2012 | Guhr | | 474/135 |
| 2003/0216204 A1 * | 11/2003 | Serkh et al. | | 474/135 |
| 2006/0079360 A1 * | 4/2006 | Jung et al. | | 474/135 |
| 2006/0172837 A1 * | 8/2006 | Quintus et al. | | 474/135 |
| 2008/0058142 A1 * | 3/2008 | Joslyn | | 474/135 |

FOREIGN PATENT DOCUMENTS

| | | |
|---|---|---|
| DE | 102004047422 | 4/2006 |
| EP | 0450620 | 11/1994 |
| EP | 0967412 | 12/1999 |
| WO | 02068841 | 9/2002 |
| WO | 2007113039 | 10/2007 |

* cited by examiner

TENSIONING AND DAMPING DEVICE FOR TRACTION-MECHANISM DRIVES

CROSS-REFERENCE TO RELATED APPLICATIONS

This application claims the benefit of U.S. Provisional Application No. 61/101,830, filed Oct. 1, 2008, as well as German Patent Application No. DE 10 2008 050384.3, filed Oct. 2, 2008, both of which are incorporated herein by reference as if fully set forth.

BACKGROUND

The invention relates to a tensioning device for a traction-mechanism drive, in particular, for a belt drive that is integrated as such in an internal combustion engine, in order to drive components of the engine or installed accessories, such as, for example, injection pumps, power steering pumps, generators, water pumps, air-conditioning compressors, or comparable units.

From WO 2007/113039, a belt-tensioning device is known that has a cup-shaped housing and a swivel arm supported thereon so that it can pivot. This belt-tensioning device further comprises a torsion spring that is constructed as a cylindrical spring and by which a torque that acts between the cup-shaped housing and the swivel arm is generated. Using this torque it is possible to force a tensioning roller attached to the swivel arm against a belt section, typically a loose belt section of the belt drive and, in this way, to create a sufficient tensioning function for maintaining the friction-fit coupling of the disks of the belt drive. Furthermore, between the cup-shaped housing and the swivel arm, a friction ring structure is active through which the movement of the swivel arm can be braked by Coulomb friction, through which belt oscillations are damped.

From DE 101 31 916 A1, a tensioning device for traction mechanisms is similarly known, in particular, a belt-tensioning device. This tensioning device similarly comprises a fastening structure and a swivel arm that is supported thereon so that it can move and that is provided with a tensioning roller. The pivoting motion between the swivel arm and the base structure is damped by a bushing element that is inserted into the inner region of a helical spring acting as a restoring spring and that provides, as such, friction contact surfaces.

From EP 0 967 412 A2, DE 100 63 638 A1, EP 0 866 240 B1, EP 0 450 620 B1, and DE 10 2004 047 422 A1, additional belt tensioning devices are known that each have a spring-loaded swivel arm whose pivoting motion is damped by braking devices.

Furthermore, from WO 02/068841, a tensioning device is known that comprises a swivel arm that is similar to the tensioning devices noted above and that is supported on a bearing journal so that it can pivot. Attached to the bearing journal structure is a cover element that comprises a plate-like element and a friction disk and that sits on one end of the swivel arm surrounding the bearing journal.

SUMMARY

The invention provides a tensioning device that distinguishes itself through a construction that is advantageous with respect to production and construction, through a high degree of robustness, and also through a mechanical operating behavior that is advantageous especially with respect to the damping characteristics.

According to the invention, the tensioning device includes:
a base part,
a swivel arm,
a torsion spring with a first winding end section that is allocated to the swivel arm and a second winding end section that is allocated to the base part for applying a pivoting moment acting between the base part and the swivel arm and forcing the swivel arm in a tensioning direction, and
a damping device for generating a damping force that counteracts a pivoting of the swivel arm directed opposite the tensioning direction,
wherein the damping device comprises a first friction surface element that is arranged in the region of the winding end section of the torsion spring allocated to the swivel arm and that, as such, forms a friction surface that is used for applying a friction force and that sits on a counter-friction surface,
wherein this tensioning device is distinguished in that, in the region of the second winding end of the torsion spring allocated to the base part, a second friction surface element is provided that forms a friction surface sitting on a counter friction surface, and wherein the counter friction surface is formed by a friction surface structure that can pivot together with the swivel arm.

Therefore, it advantageously becomes possible to create a tensioning device for a traction mechanism drive that can be realized, overall, as a relatively compact assembly and that is distinguished by an advantageous mechanical operating behavior that can be guaranteed reliably over a long operating time period. In particular, a load on a pivot bearing supporting the swivel arm can be reduced considerably by the concept according to the invention.

The base part is advantageously constructed as a cup-shaped structure, wherein the torsion spring sits in this cup-shaped structure. The base part itself is advantageously constructed so that this can be reliably attached, in particular, fixed against rotation, to a corresponding carrier structure, for example, an internal combustion engine.

Advantageously, the friction surface structure named above is formed integrally with the swivel arm. The second friction surface element is advantageously secured against pivoting in the pivoting direction of the swivel arm by corresponding engagement contours on the base part.

It is advantageously possible to form the friction surface structure by a pot-shaped section overlapping the base part and advantageously integrated with the swivel arm.

Advantageously, a radial opening is formed in the base part and the second friction surface element is inserted into this opening such that this projects through the opening onto the friction surface structure from the inside. The second friction surface element is here loaded advantageously in the radial direction from the inside by a winding end section of the torsion spring.

The second friction surface element is advantageously arranged such that a normal force applied by this on the counter friction surface, as well as optionally also the friction force generated by the friction surface element forms part of a force system that leads as such to a reduction of the transverse force and/or the tilting moment load of a pivot bearing supporting the swivel arm.

An end stop structure acting as a pivoting angle limit can be realized between the base part and the pot-shaped section that is named above and that is advantageously integrated with the swivel arm. This end stop structure can be produced, in particular, by a tab that is constructed on the base part and that projects in the radial direction and that engages in a window that is constructed on the pot-shaped section and that has a sufficiently wide dimension in the peripheral direction corresponding to the required pivoting angle in the peripheral direction.

According to one particular aspect of the present invention, the first friction surface element is advantageously constructed as a ring structure that, in the installed state, surrounds the winding end section of the torsion spring supported on the swivel arm. The second friction surface element is also advantageously constructed as a ring structure. This ring structure could be constructed so that this surrounds the winding end section contacting the base part and advantageously also provides a spring seat geometry that supports the corresponding winding regions of the torsion springs in the axial and optionally radial directions.

Advantageously, a catch structure that is used, as such, for anchoring the friction surface element on the swivel arm or on the base part is constructed on the corresponding friction surface element.

It is also possible to allow a certain amount of displacement of the friction surface elements in the peripheral direction and to generate radial forces by means of ramp structures formed on the corresponding friction surface element or interacting in some other way with the friction surface element, wherein these radial forces increase or decrease, as such, the braking effect of the friction surface elements accordingly.

The pivoting support of the swivel arm is advantageously implemented by a pivot bearing journal arranged in the inner region of the base part. This pivot bearing journal can be optionally integrated with the base part. Alternatively, it is also possible to construct the pivot bearing journal as a cylindrical element and to anchor this in the base part, for example, by a press interference fit.

It is advantageously possible to implement the support of the swivel arm on the pivot bearing journal by inclusion of a bearing bushing that is produced, for example, from a plastic material loaded with fillers.

It is possible to form the two friction surface elements so that they completely house the torsion springs in the axial direction and form, in this respect, a housing element formed from two bushings that can rotate relative to each other and wherein this housing element holds the torsion springs in an essentially dust-tight manner.

Advantageously, flanks projecting inward in the radial direction are formed on at least one of the friction surface elements. These flanks are advantageously shaped so that, through these flanks, the friction surface element is loaded in the axial direction by the torsion springs and tensioned against the swivel arm or the base part.

A seat structure can be provided by the appropriate friction surface element for the axial and optionally also radial support of the corresponding winding end sections of the torsion springs.

The torsion spring is advantageously constructed as a so-called legless cylindrical spring. The spring wire can have a round or optionally, at least in the region of the winding end sections, a non-round cross section, in particular, a square cross section. The torsion spring and the structures formed for anchoring the same in the base part and also the swivel arm are advantageously designed so that the spring wire ends are located approximately in the same peripheral position relative to the pivot axis when the tensioned position of the swivel arm prevailing in controlled operation is achieved.

The contact surfaces of the two friction surface elements are advantageously located in the region of essentially diametrically opposite peripheral positions. The lines of force of the spring force introduced by the torsion spring into the base part and, in particular, into the swivel arm advantageously extend essentially parallel to the lines of force of the belt reaction force acting on the swivel arm or a tensioning roller carried by this swivel arm.

BRIEF DESCRIPTION OF THE DRAWINGS

Additional details and features of the invention result from the following description in connection with the drawing. Shown are.

DETAILED DESCRIPTION OF THE PREFERRED EMBODIMENTS

Figure 1:
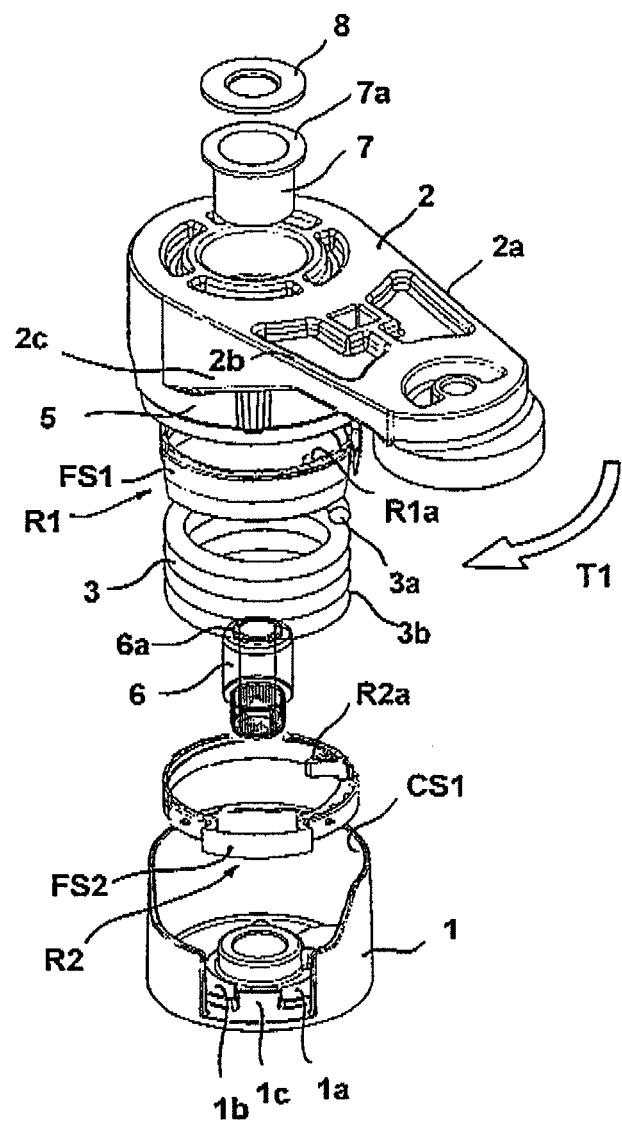
FIG. 1 a perspective, exploded view of a tensioning device according to the invention for illustrating the individual components of this device, FIG. 2 an axial section view for further illustrating structural details of the tensioning device according to FIG. 1, FIG. 3 a detail view for further illustrating structural details of the tensioning device according to FIGS. 1 and 2, FIG. 4 a perspective view of the base part according to the invention including the two friction surface elements installed therein, FIG. 5 a perspective detail view for illustrating additional details of the damping device, FIG. 6 a perspective detail view for illustrating additional details of the first friction surface element, FIG. 7 a perspective detail view for illustrating additional details of the second friction surface element, FIG. 8 a view illustrating the force systems active in the tensioning device, and FIG. 9 a perspective view of the bearing bushing that is provided for bearing the swivel arm within the base part and that is loaded by the concept according to the invention in a nearly tilting-moment-free way.

The tensioning device shown in FIG. 1 comprises a base part 1 constructed here as a bushing-like structure, a swivel arm 2, and a torsion spring 3 that is used, as such, to generate a pivoting moment acting between the base part 1 and the swivel arm 2 and forcing the swivel arm 2 in a tensioning direction T1.

The tensioning device further comprises a damping device that is used, as such, for generating a damping force that counteracts, in particular, a pivoting of the swivel arm directed against the tensioning direction T1. This damping device comprises a first friction surface element R1 that forms a friction surface FS1 used for applying a friction force, wherein this friction surface FS1 sits on a counter friction surface CS1 formed by an inner peripheral surface of the base part 1. The friction surface element R1 is constructed as an annular or toroidal component and is secured on the swivel arm 2, so that this pivots together with the swivel arm.

The tensioning device shown here is distinguished in that, in the region of the winding end WS2 of the torsion spring 3 allocated to the base part 1, there is a second friction surface element R2 that forms a friction surface FS2 sitting on a counter friction surface CS2. The counter friction surface CS2 is formed by a friction surface structure that is bound, in particular, integrated to the swivel arm 2.

In the embodiment shown here, the base part 1 is formed as a cup-shaped structure and is dimensioned so that the torsion spring 3 sits in the cup-shaped structure. Recesses in which the second friction surface element R2 can be inserted are formed on the floor surface region of the cup-shaped structure.

In the embodiment shown here, the friction surface structure 5 interacting with the second friction surface element R2 and forming the counter friction surface CS2 (see FIG. 2) is formed by a component section that is integrated with the swivel arm 2. In the embodiment shown here, the friction surface structure forming the counter friction surface CS2 is formed by a pot-shaped section 5 that overlaps at least to a large degree in the installed state of the base part 1.

As can be seen from the view according to FIG. 1, a radial opening 16 is formed in the base part 1 and the second friction surface element R2 is inserted into the base part 1 such that this passes through the recess 16 and projects from the inside onto the inner surface of the friction surface structure or the pot-shaped section 5. As can be seen in more detail from the following constructions, the second friction surface element R2 is pressed in the radial direction from the inside by a winding end section 3W2 of the torsion spring 3 against an inner peripheral surface of the pot-shaped section 5.

In the installed state, the second friction surface element R2 is arranged in the overall mechanics so that a radial force applied by this friction surface element R1 from the inside onto the pot-shaped section 5 of the swivel arm 2 forms a part of a force system through which a belt reaction force contacting the swivel arm 2 is at least partially compensated and a tilting moment about a cant axis perpendicular to the pivot axis otherwise generated by the spring reaction force is prevented or at least essentially reduced.

The pot-shaped section 5 formed on the swivel arm 2 and the base part 1 are constructed so that, in the interaction of these two components, a stop structure is created through which a pivoting angle limit is achieved.

The swivel arm 2 is constructed, as can be seen in this view, as a skeletal structure and is provided, on the edges, with connecting pieces 2a, 2b. These two connecting pieces 2a, 2b are shaped so that these extend essentially tangentially into the outer wall region of the pot-shaped section 5 via connecting piece flanks 2c and here cause a very rigid coupling of the swivel arm 2 with the pot-shaped section 5.

In the embodiment shown here, the first friction surface element R1 is also constructed as a ring structure that surrounds a winding end section 3W1 of the torsion spring 3 and is forced, in some section, by this winding end section 3W1 in the radial direction from the inside against the counter friction surface CS1 provided by the base part 1.

In the embodiment shown here, a ramp structure R1A, R2A is formed both on the first friction element R1 and also on the second friction surface element R2, wherein it is possible by these ramp structures to generate radial forces.

The pivot bearing of the swivel arm 2 on the base part 1 is realized by a pivot bearing journal 6 that is anchored as such locked in rotation in the base part 1. A bearing bushing 7 that is advantageously produced from a plastic-sliding material sits on this pivot bearing journal 6. The bearing bushing 7 is provided with a ring shoulder 7a. An axial lock of the swivel arm 2 on the pivot bearing journal 6 is achieved by this ring shoulder 7a in interaction with the disk 8 that can be recognized here. This axial locking can be achieved, in particular, in that a ring connecting piece 6a is formed on an end region of the pivot bearing journal 6 that as such centers the disk 8 in the installed state and that can be flanged outward in the radial direction, in order to secure the disk 8 on the pivot bearing journal 6. The additional axial locking is then realized by a screw head sitting on the disk 8 in a fastening screw passing through the pivot bearing journal 6 and anchored, for example, on an internal combustion engine.

The second friction surface element R2 is secured in the base part 1 against rotation in the peripheral direction, in particular, by the friction surface section that can be seen in this view and that passes through the recess 16 of the base part 1 in the installed position.

In the floor area of the base part 1, as already discussed, additional contours are formed through which, in particular, rotation of the friction surface element R2 is prevented in the peripheral direction and merely radial displacement of the friction surface element R2 is permitted. The two friction surface elements R1, R2 can be formed so that these form additional spring seat structures through which a certain axial and radial guidance and support of the spring end sections of the torsion spring 3 is achieved.

In the embodiment shown here, the torsion spring 3 noted above is constructed as a so-called legless spring. The torsion spring is supported by an upper spring end section 3a and a lower spring end section 3b that cannot be seen in this view on corresponding projections in the inner region of the swivel arm 2 or the base part 1. In the inner region of the base part 1, flank contours 1a, 1b are formed through which axial support of the corresponding winding end section of the torsion spring 3 is achieved. Between these two flank sections 1a, 1b, a recess 1c is formed in which the section of the friction surface element R2 that forms the friction surface FS2 and that passes through the recess 16 is also guided so that it can move in the radial direction.

Figure 2:
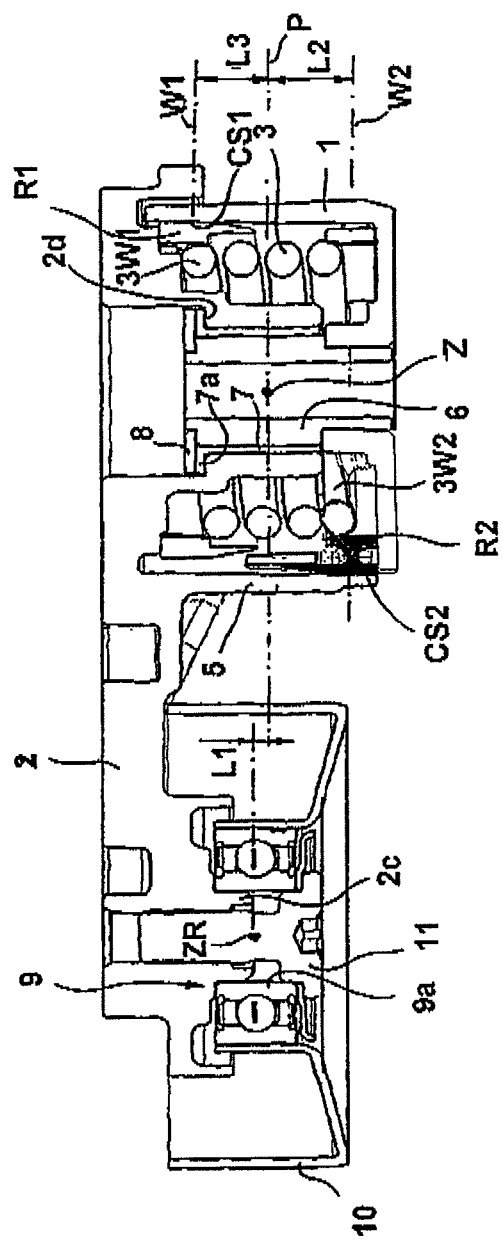
Figure 8:
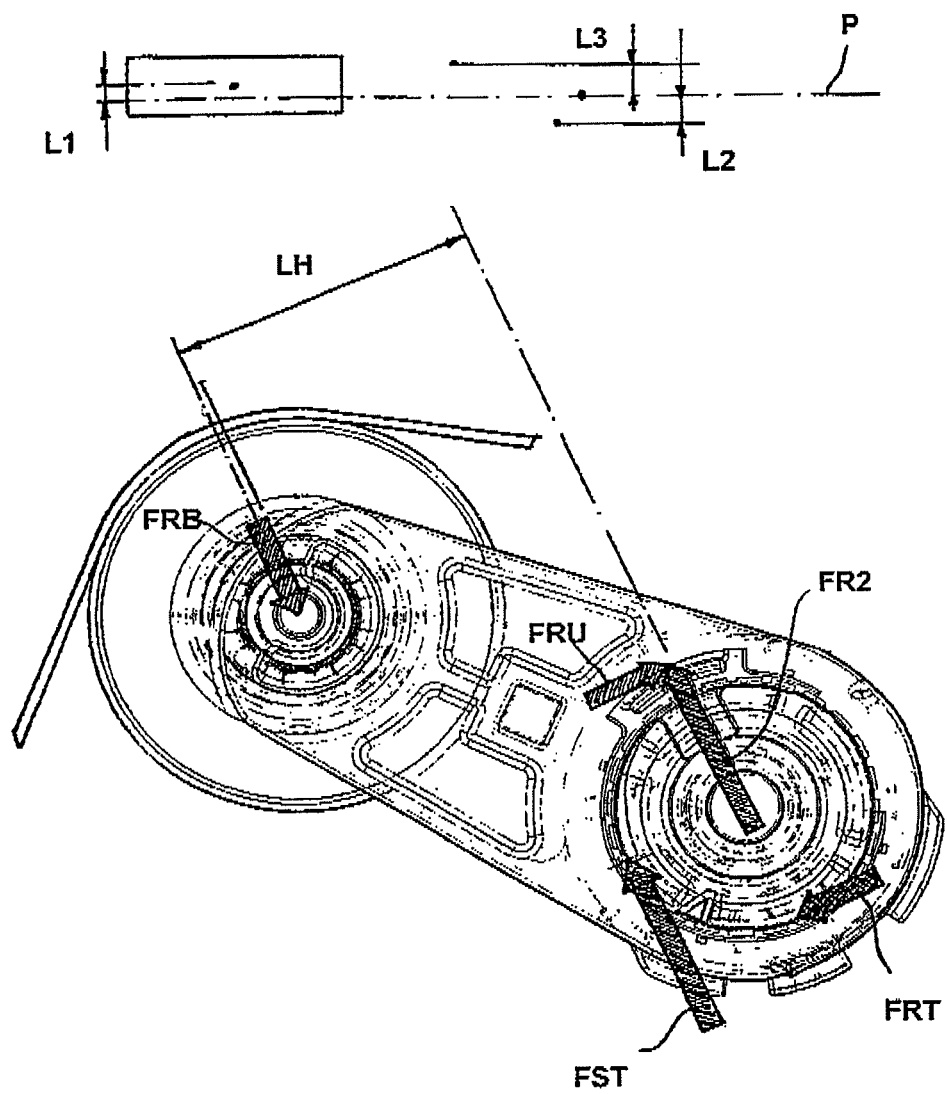

In FIG. 2, the construction of the tensioning device according to the invention is shown in the assembled state. (Note: the second friction surface element is folded into this cut plane for better illustration. The preferred peripheral position of the second friction surface element is shown in FIG. 8.) The swivel arm 2 is advantageously made from a high-load-capacity metallic material, in particular, an aluminum material. It is also possible to form the swivel arm 2 as a sheet-metal, deep-drawn part, as well as, in particular, as a sheet-metal, welded construction. A tensioning roller 10 is supported on the swivel arm 2 by a roller bearing 9. In this embodiment, the tensioning roller 10 is constructed as a sheet-metal, deep-drawn part. It is also possible to form this tensioning roller 10 in particular as a plastic component with a plurality of radial ribs. The roller bearing 9 sits via its inner ring 9a on a journal 2c integrated with the swivel arm 2. In this journal, in turn, a fastening screw 11 is anchored through which the inner ring 9a is clamped onto the bearing journal 2c. The base part 1 is, as already disclosed, formed as a cup-shaped structural component and houses, in addition to the torsion spring 3, also the pivot bearing journal 6 provided for the pivot bearing of the swivel arm 2, as well as the bearing bushing 7 sitting on this journal.

The axial locking of the swivel arm 2 on the base part 1 is achieved by the radial shoulder 7a and the disk 8 sitting on this shoulder in interaction with a corresponding ring end face 2d of the swivel arm 2. As can be seen from the view according to FIG. 2, the damping or braking of the pivoting motion of the swivel arm 2 relative to the base part 1 is achieved by two friction surface elements R1, R2.

The first friction surface element R1 is essentially locked in rotation with the swivel arm 2 and is forced by the upper winding end section 3W1 that can be seen in this view from the inside in the radial direction against a friction surface section CS1 provided by an inner peripheral surface section of the base part 1. The second friction surface element R2 that can be seen in this view is forced by the lower spring end section 3W2 from the inside in the radial direction against the counter friction surface CS2. The effective lines of the radial forces generated by the friction surface elements R1, R2 are spaced apart from each other by advantageously nearly equal distances L2, L3 from an axial plane P passing through the supporting center Z of the pivot bearing journal 7.

By tuning the radial forces generated by the spring windings 3W1, 3W2, by tuning the lengths L2, L3, and also by tuning the angular position of the effective lines of force W1, W2 (in top view), it becomes possible to generate a force system through which the total load of the pivot bearing formed by the pivot journal 7 is reduced. In particular, it becomes possible to largely compensate for tilting moments contacting the swivel arm 2 in some other way through this force system and acting about tilting axes running perpendicular to the pivot axis. Such tilting moments can be caused, in particular, by an offset of the belt force contact center ZR relative to the supporting center Z of the pivot bearing journal 7 by the distance L1 that can be seen here and also by the previously one-sided introduction of the spring reaction force into the swivel arm.

The tuning of the position of the contact points of the friction surface elements R1, R2 on the corresponding counter friction surfaces can furthermore also be realized under consideration of the tangential forces generated by the friction surface elements R1, R2. These contact points of the friction surface elements R1, R2 here can be selected furthermore so that, even under consideration of the transverse forces generated by the torsion spring 3, a minimization of the transverse force loading of the pivot bearing journal 6 and thus a reduction of the bearing load of the pivot bearing bushing 7 is achieved. The friction forces generated by the friction surface elements can be oriented so that these are nearly completely compensated.

Figure 3:
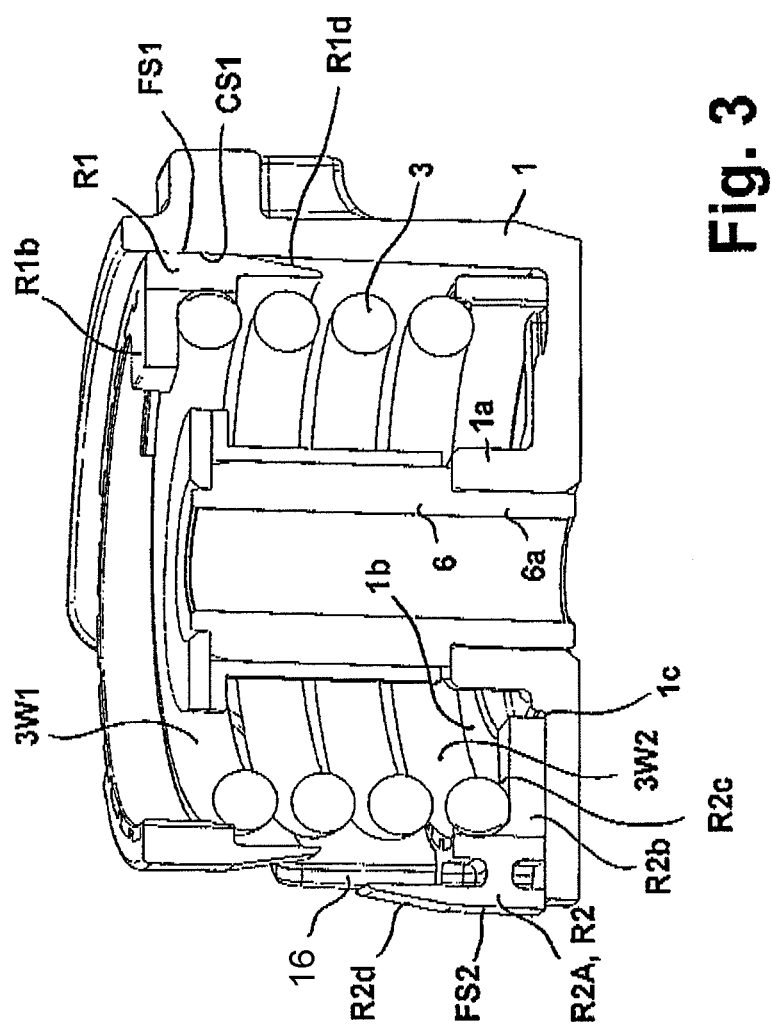

In FIG. 3, in the form of a perspective axial section view, the construction of a sub-assembly formed with the inclusion of the base part 1 is further shown. As already mentioned, the base part 1 is formed as a cup-shaped structure and has an inner flange 1a in which an end section 6a of the pivot bearing journal 6 provided with teeth is anchored. In the inner region of the base part 1 sits the second friction surface element R2. This friction surface element is formed as an essentially toroidal structure. This friction surface element 2 is forced outward in the radial direction by the spring winding end section 3W2 that can be seen here over a peripheral angle of approximately 45°. The zone of greatest radial force is offset by approximately 90° from the peripheral position of the end face of the corresponding spring end. The friction surface element R2 has a friction section R2A that passes through the recess 16 of the base part 1 and that forms a friction surface FS2. The friction surface element R2 further has a flank section R2b that projects inward in the radial direction and that also forms, as such, a spring contact surface R2C loaded in the axial direction by the spring winding end section 3W2. The radial flank R2b is guided in a recess 1c that can be seen only partially here so that it can move in the radial direction (see FIG. 1). The torsion spring winding end section 3W2 furthermore sits on a support flank 1b provided by the base part 1.

In the region of the first torsion spring winding end section 3W1, the first friction surface element R1 is arranged. This is forced by the torsion spring winding end section W1 in the radial direction against the counter friction surface CS1 formed by the inner peripheral surface of the base part 1. The first friction surface element R1 has, similar to the second friction surface element R2, a flank section R1b that projects inward in the radial direction and that is forced, under the effect of the torsion spring winding end section 3W1, in the axial direction against the inner surface region of the swivel arm 2 that cannot be seen in this view.

The peripheral sections of the friction elements R1, R2 forming the friction surfaces FS1 and FS2, respectively, and significantly clamped outward in the radial direction under the effect of the torsion spring 3 are located in a peripheral position offset relative to the front ends of the corresponding winding end sections 3W1, 3W2 each by 90 degrees.

On the friction surface elements R1, R2 there are conical ring zones R1d, R2d that, as such, simplify the insertion of the friction surface elements R1, R2 during the assembly of the tensioning device according to the invention.

Figure 4:
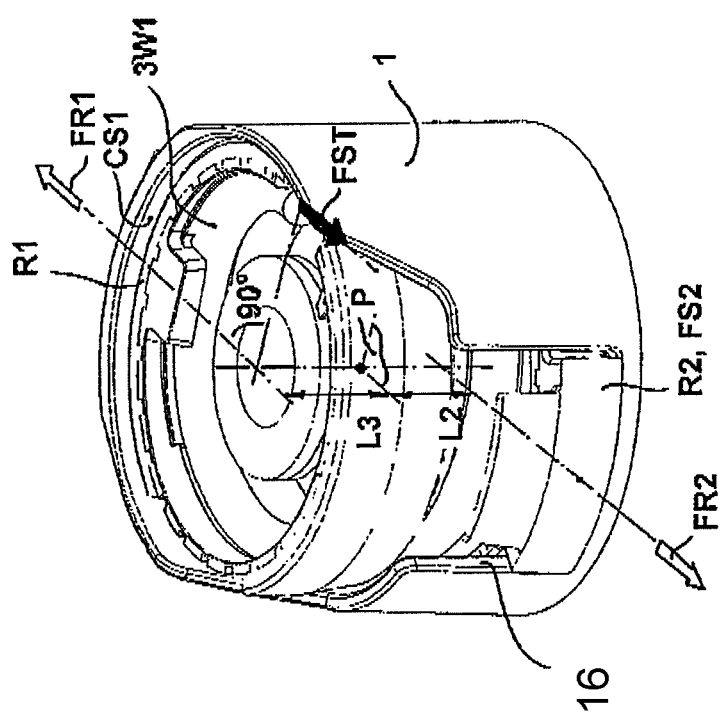

In FIG. 4, the assembly described above in connection with FIG. 3 is shown further in the form of a perspective view. In this view, in particular, the friction surface FS2 of the second friction surface element R2 exposed by the recess 16 of the base part 1 can be seen clearly. This friction surface FS2 contacts, as can be seen especially from FIG. 2, a counter friction surface CS2 that is provided by a pot-shaped section integrated with the swivel arm 2. In the region of this friction surface FS2, the radial force FR2 acting along the effective line of force W2 is generated. Through the upper winding end section 3W1, the radial force FR1 forcing the first friction surface element R1 against the counter friction surface CS1 is generated.

In the case of the tensioning device according to the invention, each friction surface element is loaded in the radial direction by the two winding end regions of the torsion spring and is forced against corresponding counter friction surface. The radial and tangential forces generated in this way are tuned by corresponding positioning of the force introduction points so that the lowest possible tilting and transverse force loading of the support of the swivel arm 2 on the bearing journal 6 is achieved. Through the concept according to the invention, in particular, the cant or tilting moment generated previously by the contact of the torsion spring 3 on the swivel arm under introduction of the spring force FST can be compensated, because the radial force FR2 contacts the pot-shaped section 5 and is spaced apart from the support center P by a distance L2 that corresponds approximately to the distance L3.

Figure 5:
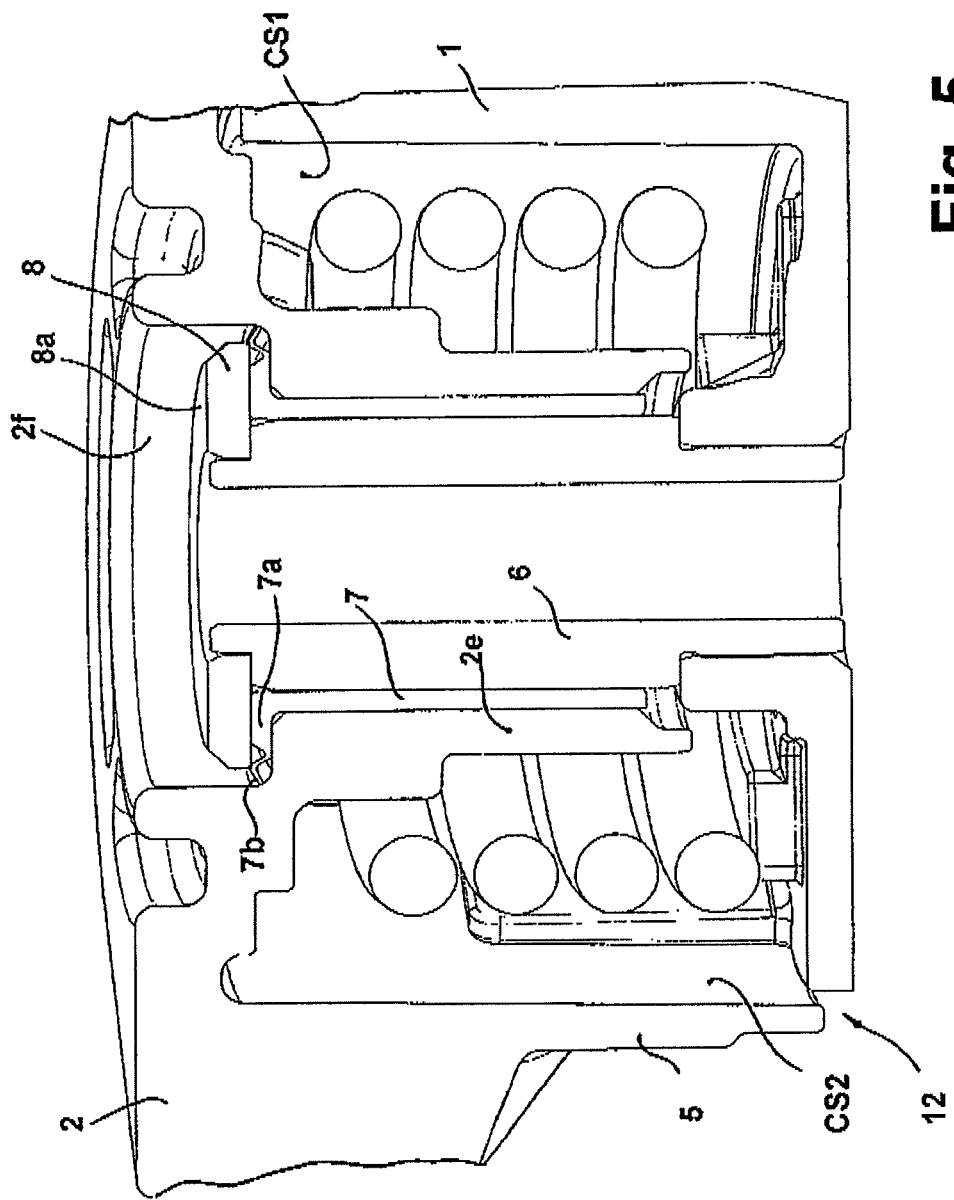

In FIG. 5, the inner construction of the base part 1 of the tensioning device according to the invention and also the inner configuration of the pot-shaped section 5 of the swivel arm 2 overlapping the base part 1 is further shown while leaving out the friction surface elements R1, R2. In this view, in particular, the additional counter friction surface CS2 interacting with the second friction surface element R2 can be seen that is formed by an inner surface section of the pot-shaped section 5 integrated with the swivel arm 2. The first counter friction surface CS1 interacting with the first friction surface element R1 not shown here can be seen in this view.

The pivot bearing of a pivot bushing section 2e integrated with the swivel arm 2 on the pivot bearing journal 6 is, as already mentioned, implemented by a bearing bushing 7. On the bearing bushing 7, in addition to a shoulder section 7a integrated with this bushing, a sealing ring section 7b similarly integrated with the pivot bearing bushing 7 is formed. This sealing ring section 7b can be produced either from the same master as the pivot bearing bushing 7 or also could be injection molded especially through a multiple shaping method in the form of an elastomer sealing lip on the corresponding peripheral edge section of the pivot bearing bushing 7. It is possible to insert a sealing ring into the inner borehole region 2f that can be seen here, wherein this sealing ring sits, for example, in a sealing manner on the edge of the end face 8a of the disk 8. It is also possible to close this inner borehole 2f in a sealed manner with a cap element after attaching the tensioning device to a corresponding carrier structure, in particular, an internal combustion engine.

Furthermore, it is also possible to form the pot-shaped section 5 of the swivel arm 2 so that this nearly completely overlaps the base part 1 and to provide a sealing ring device in the remaining movement gap region 12.

Figure 6:
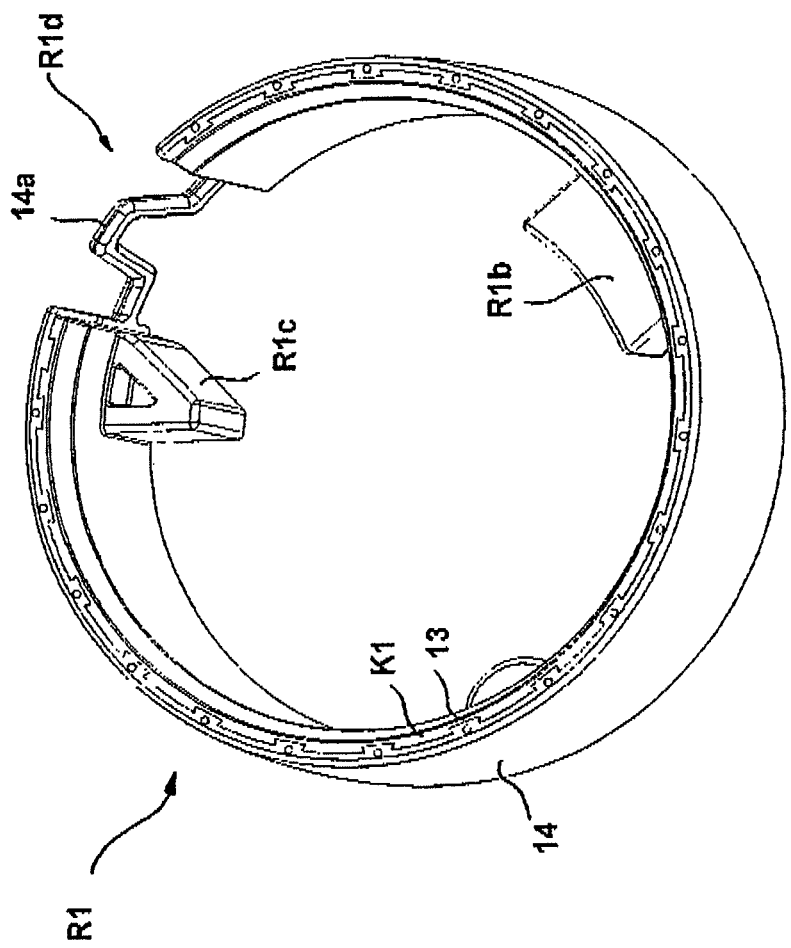

In FIG. 6, a preferred construction of the first friction surface element R1 oscillating together with the swivel arm 2 is shown. The friction surface element R1 comprises a core layer K1 that is made from a highly rigid plastic material and that is provided with an anchoring profile 13 on which the friction coating 14 made from a friction coating material is anchored. In this embodiment, this anchoring profile is made from several dovetail grooves arranged successively in the peripheral direction of the friction surface element R1. Furthermore, the already discussed flank R1B projecting inward in the radial direction and also a ramp section R1C are formed on the friction surface element R1.

The friction surface element R1 is constructed as an essentially toroidal structural component. The opening region R1D that can be seen here is covered by a bridge section 14*a* integrated with the friction coating 14. In this way, in particular, pinching of the friction surface elements R1 (also R2) is prevented if these are first feed loosely to a separating and handling system.

Figure 7:
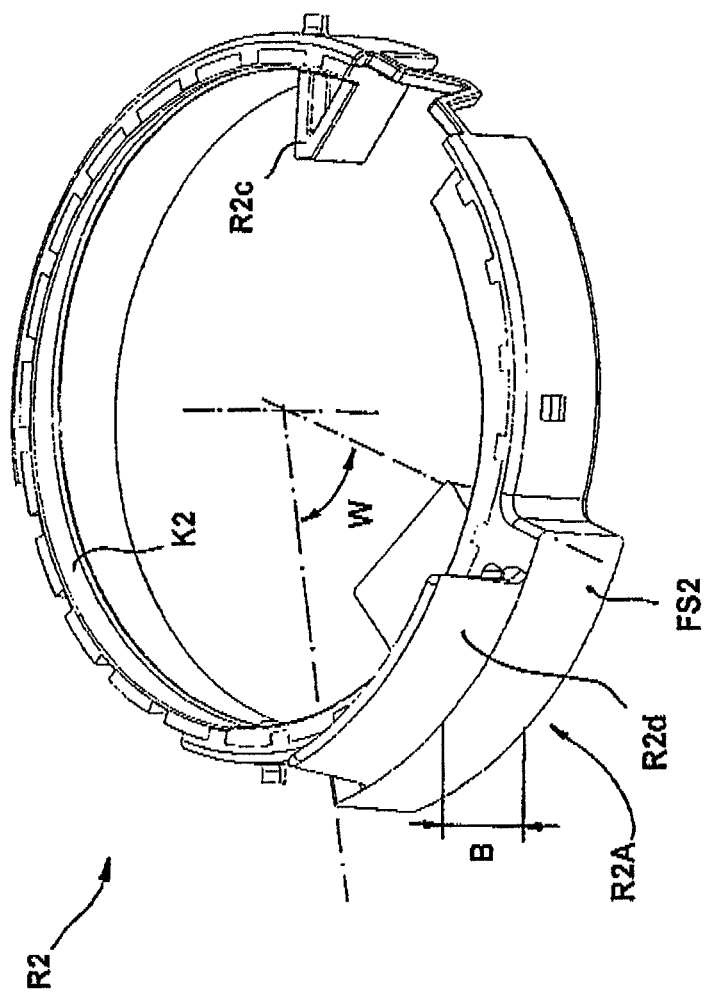

In FIG. 7, a preferred construction of the second friction surface element R2 is further shown. This second friction surface element R2 comprises, similar to the first friction surface element R1, a core layer K2 produced from a highly rigid plastic or optionally also from metal material on which the friction surface structures R2A made from a friction material are anchored at least in some sections. The second friction surface element R2 is also provided with a ramp section R2C through which a special kinematic coupling of the second friction surface element R2 with the base part 1 can be achieved. The friction surface section R2A formed on the second friction surface element R2 is shaped so that this passes through an opening formed in the base part 1 and, as already discussed, projects onto a counter friction surface oscillating together with the swivel arm 2. The width B advantageously equals 5 to 25% of the outer diameter of the torsion spring. The angle W advantageously equals 20 to 60°.

In FIG. 8, the force systems realized by the arrangement according to the invention are further shown. Through the arrangement according to the invention, it is possible to create a tensioning device whose damping potential is approximately 50 to 80% greater than the damping potential of conventional tensioning devices. Furthermore, it is possible by the arrangement according to the invention to achieve the damping by a force system that is at least largely self-compensating, so that the damping is achieved without considerable transverse force loading and also tilting moment loading of the swivel arm bearing. Furthermore, it is possible to also create a self-balancing tensioning device system by the friction ring elements arranged according to the invention on both sides of the torsion spring. The tensioning device according to the invention could be realized relatively economically and is distinguished by a construction that is simple and robust as a whole under assembly-specific viewpoints. In the case of the tensioning device according to the invention, a second friction ring is provided in comparison with conventional tensioning devices. This friction ring is supported by an opening formed in the base part on a counter friction surface oscillating with the swivel arm.

The forces that contact the swivel arm through the torsion spring and also through the belts and the lower friction ring are applied so that these lay one above the other and are also essentially parallel to the axis load direction. In addition, these forces are tuned to each other in the axial direction so that these divide the reaction force uniformly in the center of the pivot plane P.

Furthermore, in the concept according to the invention, there is the possibility to tune the shape of the ramp supporting the spring in the axial direction in the swivel arm and in the base part with large structural freedom. Here, in particular, there are the three following options:

1. No spring support ramp—i.e., essentially flat inner surfaces
2. Essentially completely surrounding (360 degrees) spring ramp with a pitch angle corresponding to that of the spring pitch
3. Section-by-section spring ramp that provides, for example, three support surfaces The upper friction ring or the upper friction surface element R2 that sits in the swivel arm 2 corresponds to essentially advantageously to the already inserted friction ring concepts.

The lower friction ring differs from the upper friction ring due to its radial projection R2*a* (see, in particular, FIG. 7).

There is the possibility to construct the pivot journal 6 made here from a steel material as an aluminum journal together with the base part 1 or a back plate corresponding to this base part 1. This allows the use of a slightly conical plastic bearing bushing element that sits on an optionally non-machined cast aluminum outer surface. In this case, metal-cutting post processing of the pivot bearing journal can be eliminated.

Figure 9:
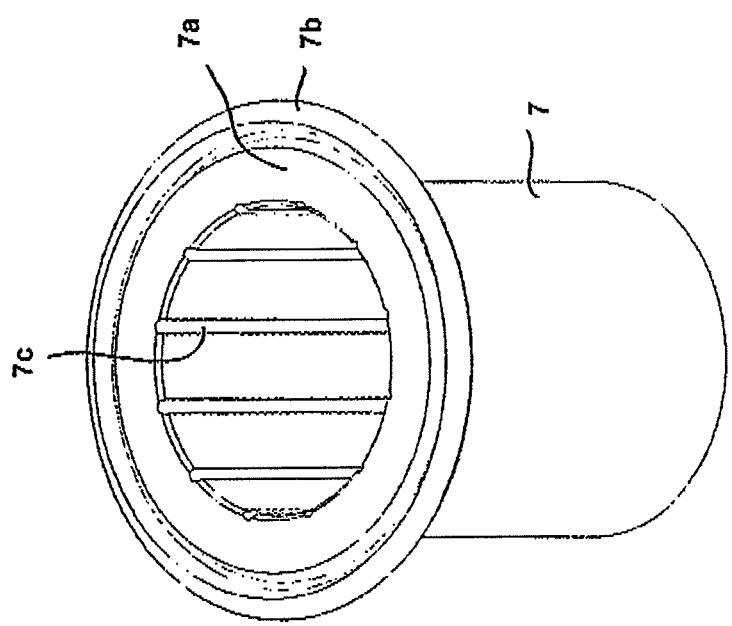

As can be seen from FIG. 9, an integral seal can be realized by the special configuration of the bearing bushing 7, especially when this bearing bushing 7 is made from a plastic material and is provided with a sealing geometry 7*b* in the region of its ring shoulder 7*a*. Longitudinal grooves 7*c* can be formed in the inner region of the bearing bushing 7.

The invention claimed is:

1. Tensioning device comprising:
    a base part,
    a swivel arm,
    a torsion spring with a first winding end section that is allocated to the swivel arm and a second winding end section that is allocated to the base part for applying a pivoting moment acting between the base part and the swivel arm and forcing the swivel arm in a tensioning direction, and
    a damping device for generating a damping force that counteracts a pivoting of the swivel arm directed against the tensioning direction,
    the damping device comprises a first friction surface element that is arranged in a region of a first winding end section of the torsion spring allocated to the swivel arm and forms as such a first friction surface that is used for applying a friction force and sits on a first counter friction surface,
    in a region of the second winding end of the torsion spring allocated to the base part, there is a second friction surface element that forms a second friction surface that sits on a second counter friction surface, and the second counter friction surface is formed by a friction surface structure that can pivot together with the swivel arm, wherein a radial opening is formed in the base part and the second friction surface element projects from inside through the opening onto the friction surface structure.

2. Tensioning device according to claim 1, wherein the base part is constructed as a cup-shaped structure and the torsion spring sits in the cup-shaped structure.

3. Tensioning device according to claim 1, wherein the friction surface structure is integrated with the swivel arm.

4. Tensioning device according to claim 1, wherein the second friction surface element is secured against pivoting in the swivel arm pivoting direction.

5. Tensioning device according to claim 1, wherein the friction surface structure is formed by a pot-shaped section overlapping the base part.

6. Tensioning device according to claim 1, wherein the second friction surface element is loaded from inside in a radial direction by the second winding end section.

7. Tensioning device according to claim 1, wherein the second friction surface element is arranged so that a radial force applied thereby on the counter friction surface forms part of a force system that provides a reduction of a tilting moment loading of the pivot bearing supporting the swivel arm.

8. Tensioning device according to claim 1, wherein the swivel arm is provided with a pot-shaped section overlapping the base part and a pivoting angle limit is formed between the base part and the pot-shaped section.

9. Tensioning device according to claim 1, wherein the first friction surface element is constructed as a ring structure.

10. Tensioning device according to claim 1, wherein the second friction surface element is constructed as a ring structure.

11. Tensioning device according to claim 1, wherein a catch structure is constructed on at least one of the friction surface elements for anchoring the friction surface element in position.

12. Tensioning device according to claim 1, wherein ramp structures are constructed on at least one of the friction surface elements for generating radial forces in a region of the ramp structure.

13. Tensioning device according to claim 1, wherein a pivot bearing journal sits in an inner region of the base part.

14. Tensioning device according to claim 13, wherein the pivot bearing journal is anchored on the base part.

15. Tensioning device according to claim 13, wherein a bearing bushing sits on the pivot bearing journal and the swivel arm is supported on the bearing bushing.

16. Tensioning device according to claim 1, wherein the two friction surface elements are combined into a housing element and the torsion spring sits in the housing element.

17. Tensioning device according to claim 1, wherein flanks projecting inward in a radial direction are constructed on at least one of the friction surface elements and the friction surface element is loaded in an axial direction by the flanks.

18. Tensioning device according to claim 1, wherein a seat structure is formed by at least one of the friction surface elements for at least one of axial and radial support of a corresponding one of the winding end sections of the torsion spring.

19. Tensioning device comprising:
a base part,
a swivel arm,
a torsion spring with a first winding end section that is allocated to the swivel arm and a second winding end section that is allocated to the base part for applying a pivoting moment acting between the base part and the swivel arm and forcing the swivel arm in a tensioning direction,
a damping device for generating a damping force that counteracts a pivoting of the swivel arm directed against the tensioning direction, and
a tensioning roller device that is supported on the swivel arm for introducing a traction mechanism reaction force into the swivel arm,
the torsion spring is coupled kinematically with the swivel arm and the base part such that effective lines of spring tangential forces contacting the base part and the swivel arm via spring wire end faces extend at least approximately parallel to an effective line of a traction mechanism reaction force; wherein a radial opening is formed in the base part and a friction surface element projects from inside the base part through said opening onto a friction surface structure.

20. Traction mechanism drive comprising:
a traction mechanism,
a tensioning device with:
a base part,
a swivel arm,
a torsion spring with a first winding end section that is allocated to the swivel arm and a second winding end section that is allocated to the base part for applying a pivoting moment acting between the base part and the swivel arm and forcing the swivel arm in a tensioning direction,
a damping device for generating a damping force that counteracts a pivoting of the swivel arm directed against the tensioning direction, and
a tensioning roller device that is supported on the swivel arm for introducing a traction mechanism reaction force into the swivel arm,
the torsion spring is coupled with the swivel arm in a region of the first winding end section, effective lines of a spring tangential force contacting the swivel arm extend at least approximately parallel to an effective line of a traction mechanism reaction force, and the second winding end section allocated to the base part is used for generating a spring radial force that forces a friction surface element against a counter friction surface provided by the swivel arm such that the effective line of a radial force acting on the counter friction surface also extends parallel to the effective line of the traction mechanism reaction force; wherein a radial opening is formed in the base part and the friction surface element projects from inside the base part through said opening onto a friction surface structure.

21. Traction mechanism drive according to claim 20, wherein an axial dimension of the counter friction surface measured in the axial direction to the swivel arm pivot axis from the contact point of the torsion spring on the swivel arm corresponds essentially to an average axial length of the torsion spring.

22. Tensioning device with:
a base part,
a swivel arm,
a torsion spring with a first winding end section that is allocated to the swivel arm and a second winding end section that is allocated to the base part for applying a pivoting moment acting between the base part and the swivel arm and forcing the swivel arm in a tensioning direction,
a damping device for generating a damping force that counteracts a pivoting of the swivel arm directed against the tensioning direction, and
a tensioning roller device that is supported on the swivel arm for introducing a traction mechanism reaction force into the swivel arm,
friction surface elements are loaded in the radial direction by the torsion spring both in a region of the first winding end section and also in a region of the second winding end section such that friction forces generated by the friction surface elements and contacting the swivel arm are directed against each other; wherein a radial opening is formed in the base part and one of the friction surface elements projects from inside the base part through said opening onto a friction surface structure.

* * * * *